United States Patent
Cordova et al.

(10) Patent No.: US 9,021,929 B2
(45) Date of Patent: May 5, 2015

(54) PIZZA CUTTER

(71) Applicants: Robert Cordova, Whittier, CA (US); Eduardo Martinez, Pico Rivera, CA (US)

(72) Inventors: Robert Cordova, Whittier, CA (US); Eduardo Martinez, Pico Rivera, CA (US)

(*) Notice: Subject to any disclaimer, the term of this patent is extended or adjusted under 35 U.S.C. 154(b) by 135 days.

(21) Appl. No.: 13/829,400

(22) Filed: Mar. 14, 2013

(65) Prior Publication Data

US 2013/0239763 A1     Sep. 19, 2013

Related U.S. Application Data

(60) Provisional application No. 61/610,693, filed on Mar. 14, 2012.

(51) Int. Cl.
*B26D 1/00* (2006.01)
*A21C 15/04* (2006.01)

(52) U.S. Cl.
CPC ............... *A21C 15/04* (2013.01); *Y10S 83/932* (2013.01)

(58) Field of Classification Search
USPC ............ 30/114, 287, 289, 280, 340, 342; 83/620–621, 932, 34, 35, 618, 694, 83/695, 696; 99/537; D7/381
See application file for complete search history.

(56) References Cited

U.S. PATENT DOCUMENTS

| 4,250,618 | A | | 2/1981 | Custer et al. | |
|---|---|---|---|---|---|
| 4,648,300 | A | * | 3/1987 | Hassenfelt, Jr. | 83/762 |
| D298,603 | S | * | 11/1988 | White | D8/98 |
| 4,924,575 | A | * | 5/1990 | James | 30/315 |
| D316,656 | S | | 5/1991 | Hall | |
| 5,920,992 | A | * | 7/1999 | Watermolen et al. | 30/315 |
| 6,009,786 | A | * | 1/2000 | Hjelden | 83/620 |
| 6,557,260 | B1 | | 5/2003 | Morris | |
| 7,191,902 | B1 | * | 3/2007 | Nelson et al. | 206/551 |
| D586,627 | S | * | 2/2009 | Carrell | D7/672 |
| D589,310 | S | * | 3/2009 | Carrell | D7/672 |
| D590,215 | S | * | 4/2009 | Carrell | D7/672 |
| D593,363 | S | | 6/2009 | Collinson | |
| 7,984,667 | B2 | | 7/2011 | Freudinger | |

* cited by examiner

*Primary Examiner* — Omar Flores Sanchez
(74) *Attorney, Agent, or Firm* — Kenneth L. Green; Averill & Green

(57) ABSTRACT

A pizza cutter includes at least one blade, a handle attached to the blade, and extenders for positioning the cutter in a pizza box to cut uniform slices of pizza. The blade may be a single blade or two blades forming a 90 degree "X". The handle is attached across the top of the blade and may include slots to better grasp the handle. The extenders are attached to opposite ends of the cutter and may be fixed or rotating, and intersect opposite corners of the pizza box to align the blade to cut uniform slices.

19 Claims, 5 Drawing Sheets

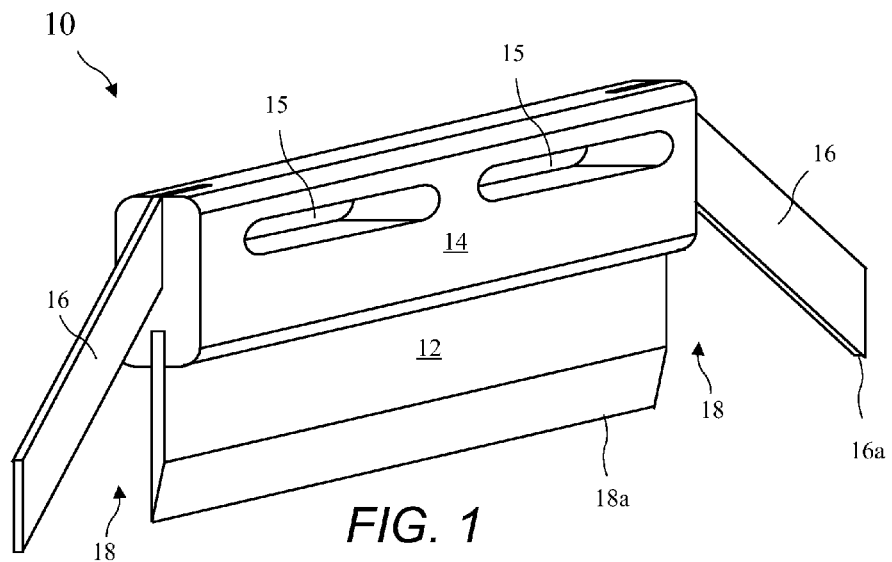
FIG. 1
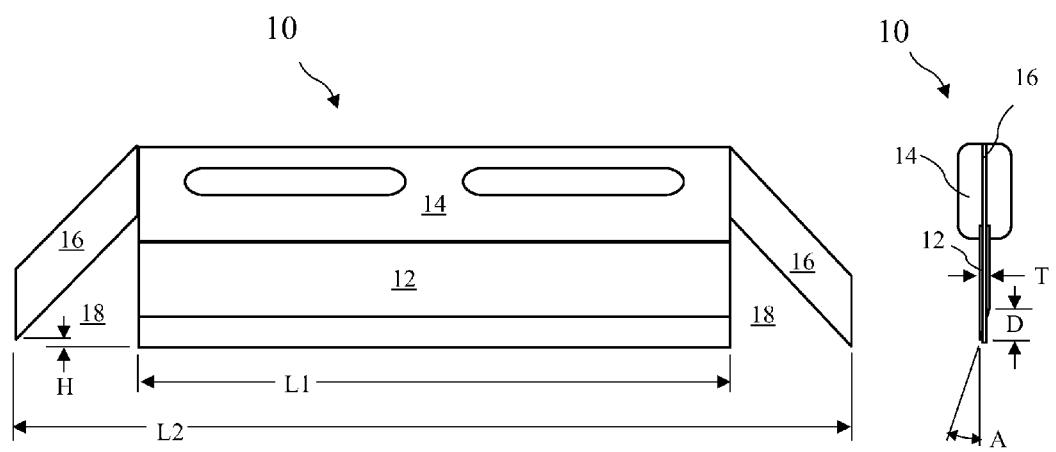
FIG. 2A
FIG. 2B

PIZZA CUTTER

CROSS-REFERENCE TO RELATED APPLICATIONS

The present application claims the priority of U.S. Provisional Patent Application Ser. No. 61/610,693 filed Mar. 14 2012, which application is incorporated in its entirety herein by reference.

BACKGROUND OF THE INVENTION

The present invention relates to pizza cutters and in particular to a self aligning pizza cutter for use with a boxed pizza.

Pizza is a very popular food over large part of the world and is often bought in large quantities for parties, meetings, and the like. Pizza stores often receive large orders and on many occasions receive a large number of orders over a short period of time. Many pizza stores use conveyor belt ovens to rapidly produce enough pizzas to meet the high demand. The pizzas are cooked, boxed, and then cut into slices. Unfortunately, typical pizza cutting is performed using a single cutting blade and the slices often vary significantly in size.

BRIEF SUMMARY OF THE INVENTION

The present invention addresses the above and other needs by providing a pizza cutter which includes at least one blade, a handle attached to the blade, and extenders for positioning the cutter in a pizza box to cut uniform slices of pizza. The blade may be a single blade or two blades forming a 90 degree "X". The handle is attached across the top of the blade and may include slots to better grasp the handle. The extenders are attached to opposite ends of the cutter and may be fixed or rotating, and intersect opposite corners of the pizza box to align the blade to cut uniform slices.

In accordance with one aspect of the invention, there is provided a pizza cutter for a fourteen inch diameter pizza. Fourteen inch diameter pizzas are the most common pizza. The pizza cutter blade is preferably between 13.5 and 14.125 inches long, and more preferably 14.125 inches long, and the extenders reach between 2.65 and 2.9 inches and more preferably about 2.9 inches past the ends of the blade, thus reaching to opposite inside corners of the pizza box to align the blade to make precise diagonal pizza cuts.

In accordance with another aspect of the invention, there is provided a pizza cutter having fixed extenders. The extenders are attached high on the cutter and gaps are provided between the blade and the extenders at each end of the blade providing clearance for a vertical box edge when making square cuts and aligning the blade for making diagonal cuts.

In accordance with still another aspect of the invention, there is provided a pizza cutter having pivoting extenders. The extenders are lifted when making square cuts and pivoted down for making diagonal cuts In accordance with yet another aspect of the invention, there is provided a pizza cutter having removable extenders. The extenders are removed when making square cuts and attached to ends of the blade for making diagonal cuts.

In accordance with another aspect of the invention, there is provided a pizza cutter having a single blade. The single blade allows easy cutting of many pizzas.

In accordance with still another aspect of the invention, there is provided a pizza cutter having two blades spaced apart by 90 degrees. The two blades allow quick cutting of many pizzas.

In accordance with still another aspect of the invention, there is provided a pizza cutter having a fixed blade, and a spring loaded blade spaced apart by 90 degrees from the fixed blade. The spring loaded blade retracts into the handle when resistance is met, and may be aligned with a first cut by the fixed blade to provide uniform pizza slices.

In accordance with yet another aspect of the invention, there is provided a method for cutting pizza. The method includes placing a pizza in a pizza box, positioning extenders at ends of a pizza blade, the extenders reaching a distance equal to a diagonal distance between opposite interior corners of the pizza box, pushing the cutter down into the pizza with extenders reaching into the opposite interior corners of the pizza box, making a first diagonal cut, lifting the pizza cutter, rotating the pizza cutter 90 degrees, pushing the cutter down into the pizza with extenders reaching into second opposite interior corners of the pizza box, making a second diagonal cut, lifting the pizza cutter, aligning the pizza cutter over the pizza and intersecting the first diagonal cut and the second diagonal cut for a first square cut, pushing the cutter down into the pizza, making the first square cut, rotating the pizza cutter 90 degrees, pushing the cutter down into the pizza, making a second square cut, and lifting the pizza cutter.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a perspective view of a pizza cutter according to the present invention.

FIG. 2A is a side view of the pizza cutter according to the present invention.

FIG. 2B is an end view of the pizza cutter according to the present invention.

Corresponding reference characters indicate corresponding components throughout the several views of the drawings.

DETAILED DESCRIPTION OF THE INVENTION

Figure 3:
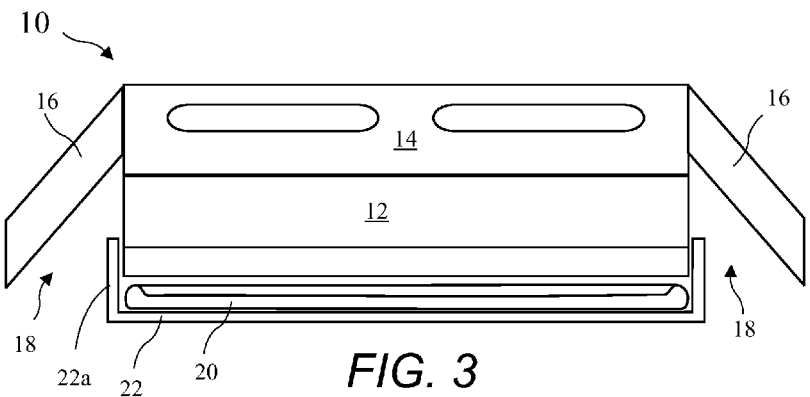
FIG. 3 shows the pizza cutter according to the present invention having fixed extenders ready to cut a pizza in a pizza box.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective view of a pizza cutter 10 according to the present invention is shown in FIG. 1. The pizza cutter 10 includes a handle 14 having wide slots 15 allowing easy grasping and a blade 12 attached to the bottom of the handle 14. Extenders 16 are attached to each end of the cutter. The extenders 16 reach outward and downward from the handle 14 and are configured to reside against opposite diagonal inside corners of a pizza box to center and align the blade 12 to make a diagonal cut. The pizza cutter 10 may then be rotated 90 decrees to make a second diagonal cut. The extenders 16 reach a distance of the square root of two times the width of the blade 12 to correctly position the blade for diagonal cuts. The extenders 16 reach down to between a height H above the cutting edge 18a of the blade and even with the cutting edge 18a of the blade and are preferably even with the cutting edge 18a of the blade 18. The height H is preferably about ⅜ inches.

The pizza cutter 10 further includes gaps 18 between the blade 12 and the extenders 16. The gaps 18 allow clearance for the side of the pizza box when square cuts are made with a pizza cutter having fixed extensions 16.

A side view of the pizza cutter 10 is shown in FIG. 2A and an end view of the pizza cutter 10 is shown in FIG. 2B. The blade 12 has a length L1 and the extensions 16 add additional length for an overall length L2. The blade 12 preferably has an edge angle A, a cutter depth D, and a thickness T. The most popular pizza size is a fourteen inch diameter round pizza, and the blade length L1 for cutting a fourteen inch diameter pizza is preferably between 13.5 and 14.125 inches, and more preferably 14.125 inches. A shorter blade may fail to cut the entire pizza, although a very slight amount of uncut crust is generally acceptable. The pizza is generally cut inside a pizza box which is square with inside dimensions of about 14.125 by 14.125 inches. If the blade is longer than 14.125 inches, the box will interfere with a square (i.e., the blade parallel with the sides of the box).

The overall extension length L2 is selected to fit inside opposite interior corners of the pizza box to position the pizza cutter 10 for diagonal cuts. In general, the length L2 is equal to the square root of two times the length L1. For a fourteen inch pizza, the length L2 is preferably between 19.5 and 20.5 inches, and more preferably about 20 inches. The blade angle A is preferably between 70 and 75 degrees and more preferably about 70 degrees, the cutting depth D is preferably about ½ inches, and the thickness T is preferably about 3/16 inches.

The pizza cutter 10 having fixed extenders 16 ready to cut a pizza 20 in a pizza box 22 is shown in FIG. 3. The pizza box 22 includes sides (or edges) 22a, and the gaps 18 allow the pizza cutter 10 to clear the sides 22a when the cut is made.

Figure 3A:
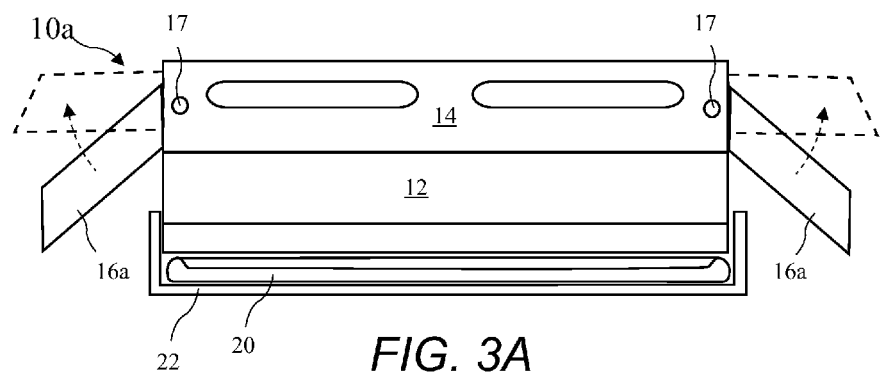
FIG. 3A shows the pizza cutter according to the present invention having pivoting extenders ready to cut a pizza in a pizza box.

A pizza cutter 10a according to the present invention having pivoting extenders 16a pivoted upward to cut the pizza 20 in the pizza box 22 is shown in FIG. 3A. The extenders 16a do not require a gap 18 and pivot upward around shafts 17 to clear the sides 22a when the cut is made. The shafts 17 may be solid pins, rolled pins, threaded shafts, or the like.

Figure 3B:
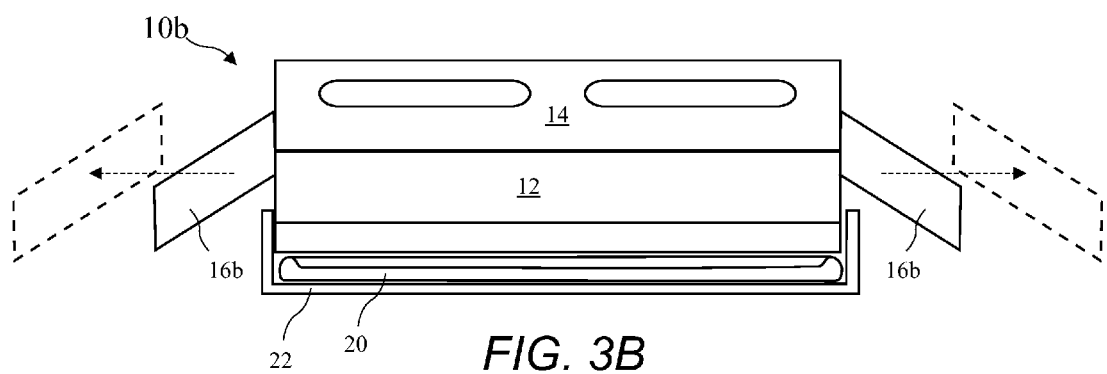
FIG. 3B shows the pizza cutter according to the present invention having removable extenders ready to cut a pizza in a pizza box.

A pizza cutter 10b according to the present invention having removeable extenders 16b removed to cut the pizza 20 in the pizza box 22 is shown in FIG. 3B. The extenders 16b do not require a gap 18 and are removed to clear the sides 22a when the cut is made.

Figure 4:
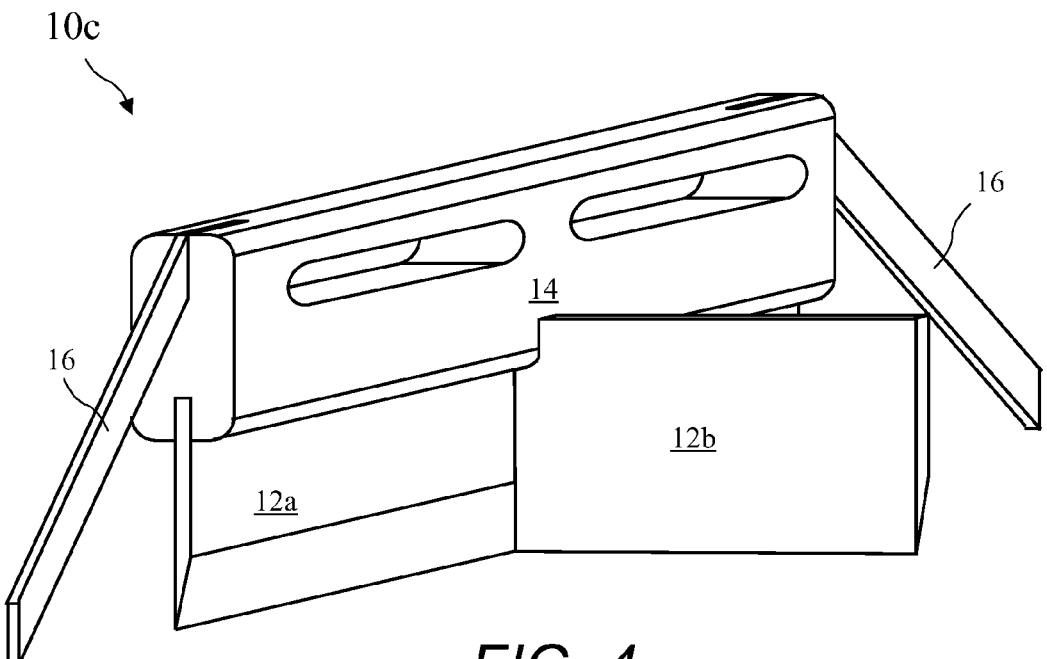
FIG. 4 shows a pizza cutter according to the present invention having two fixed blades spaced apart at 90 degrees.

A pizza cutter 10c according to the present invention having two fixed blades 12a and 12b spaced apart at 90 degrees is shown in FIG. 4. The two blades 12a and 12b allow making two cuts simultaneously to save time. A second handle may be included above the blade 12b.

Figure 5:
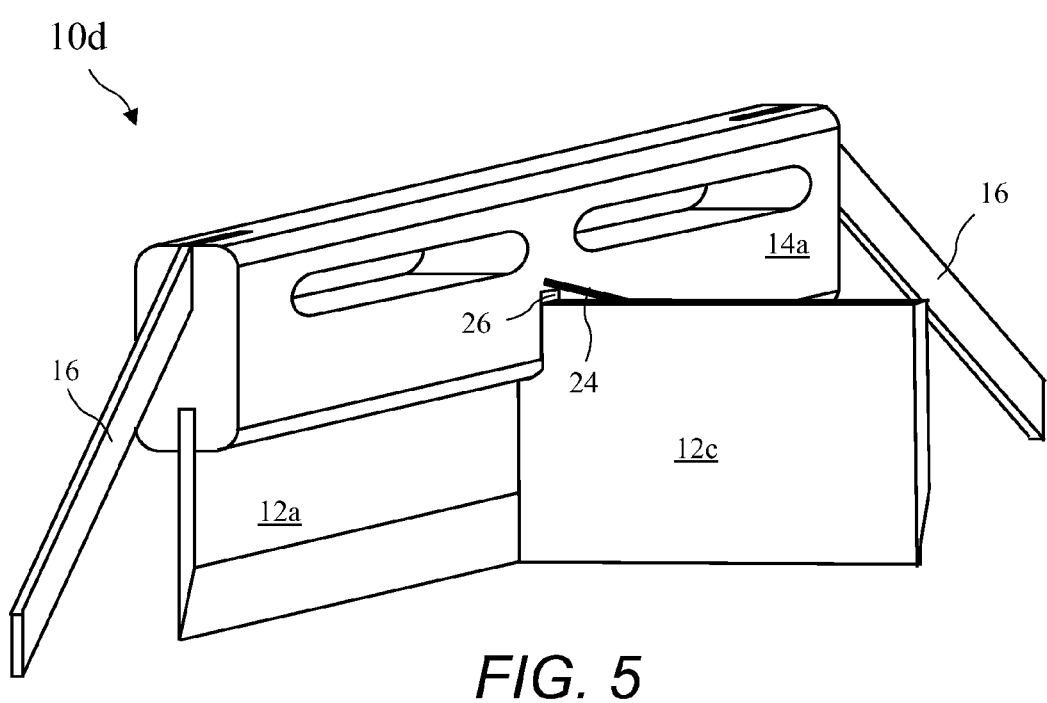
FIG. 5 shows a pizza cutter according to the present invention having a fixed blade, and a spring loaded blade spaced apart 90 degrees from the fixed blade.

A pizza cutter 10d according to the present invention having a fixed blade 12a, and a spring loaded blade 12c spaced apart 90 degrees from the fixed blade 12a, is shown in FIG. 5. A leaf spring 24 exerts downward force on the spring loaded blade 12c. The spring loaded blade 12b retracts towards the handle 14a in a slot 26 when the pizza cutter 10d is pressed downward to cut the pizza. Although the blade 12c does not cut the pizza, it does allow a user to make a first cut with the blade 12a, rotate the pizza cutter 90 degrees and align the cutter by lining the blade 12c with the first cut, to make a second cut 90 degrees from the first cut. Various other springs, for example, a coil spring, may be substituted for the leaf spring 24. A second handle may be included above the blade 12c.

Figure 6:
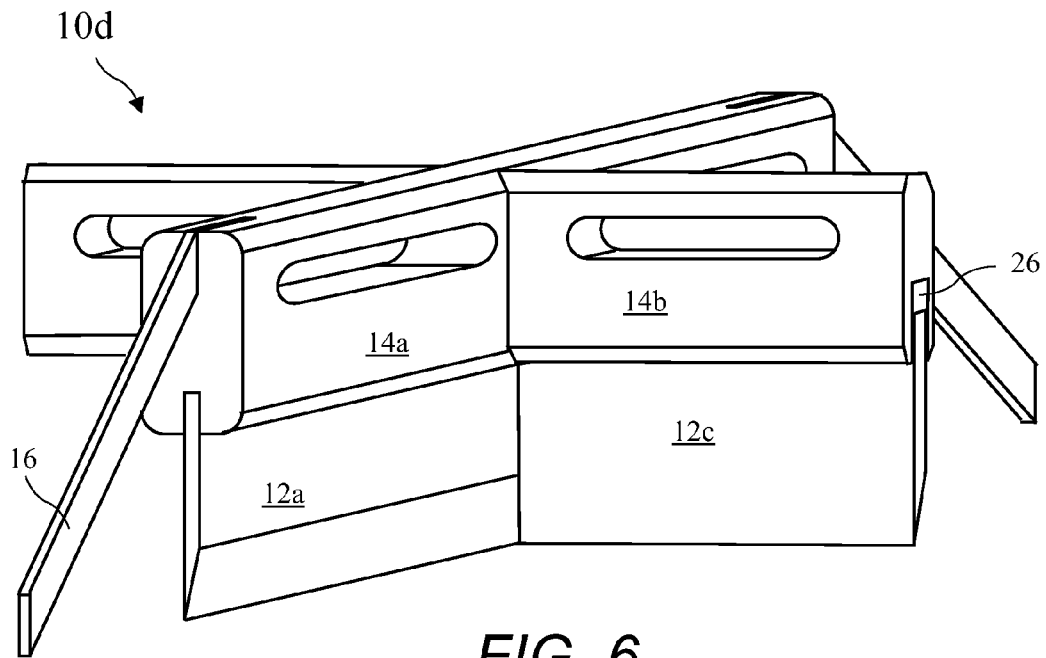
FIG. 6 shows a pizza cutter according to the present invention having two blades and two handles.

A pizza cutter 10d having two handles 14a and 14b is shown in FIG. 6. The pizza cutter 10d may have fixed blades or one fixed blade and one spring loaded blade. When the second blade is a spring loaded blade 12c, a slot 26 is provided in the handle 14b and a spring 24 (see FIG. 5) is housed in the handle 14b, which spring 24 may be a leaf sprint, a coil spring, or the like.

Figure 7C:
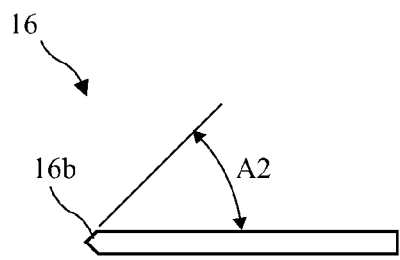
FIG. 7C shows a top view of the extender according to the present invention.
Figure 7A:
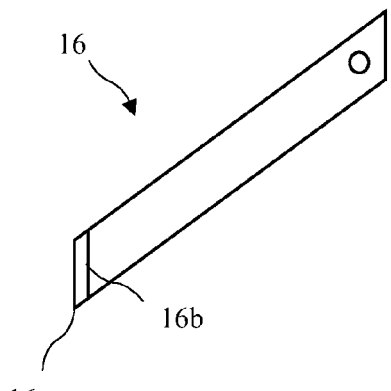
FIG. 7A shows a side view of the extender according to the present invention.
Figure 7B:
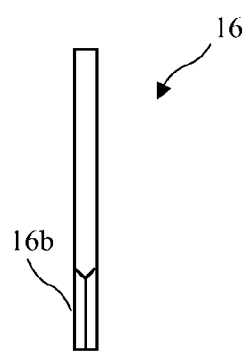
FIG. 7B shows an end view of the extender according to the present invention.

A side view of the extender 16 is shown in FIG. 7A, an end view of the extender 16 is shown in FIG. 7B, and a top view of the extender 16 is shown in FIG. 7C. The extender 16 may include a pointed end 16b having two sides preferably at an angle A2 of about 45 degrees to side of the extender 16. The pointed end 16b intersects the inside corners of the pizza box and are preferably vertical to fit against the inside corners of the pizza box.

Figure 8:
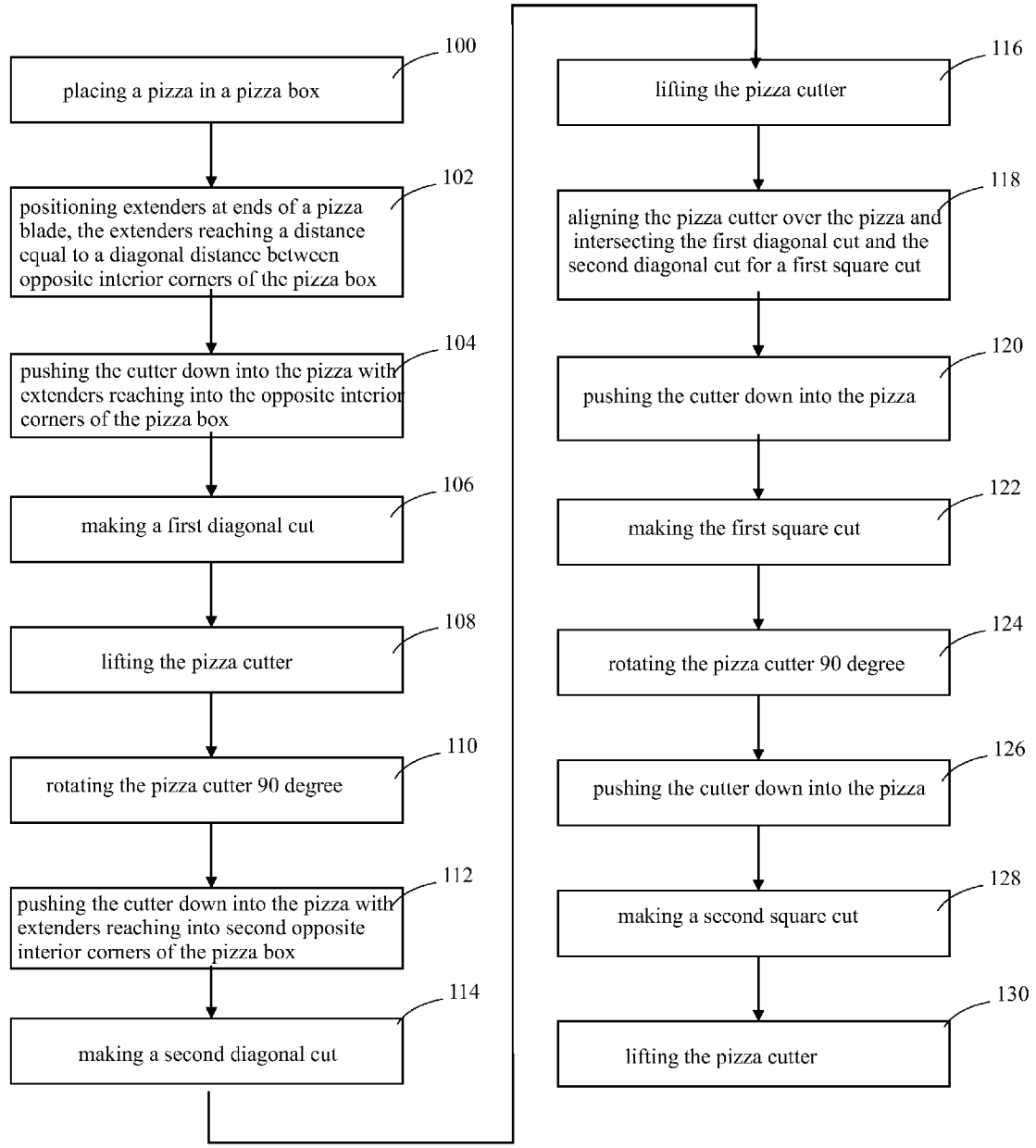
FIG. 8 is a method for pizza cutting according to the present invention.

A method for cutting pizza is shown in FIG. 8. The method includes placing a pizza in a pizza box at step 100, positioning extenders at ends of a pizza blade, the extenders reaching a distance equal to a diagonal distance between opposite interior corners of the pizza box at step 102, pushing the cutter down into the pizza with extenders reaching into the opposite interior corners of the pizza box at step 104, making a first diagonal cut at step 106, lifting the pizza cutter at step 108, rotating the pizza cutter 90 degrees at step 110, pushing the cutter down into the pizza with extenders reaching into second opposite interior corners of the pizza box at step 112, making a second diagonal cut at step 114 lifting the pizza cutter at step 116, aligning the pizza cutter over the pizza and intersecting the first diagonal cut and the second diagonal cut for a first square cut at step 118, pushing the cutter down into the pizza at step 120, making the first square cut at step 122, rotating the pizza cutter 90 degrees at step 124, pushing the cutter down into the pizza at step 126, making a second square cut at step 128, and lifting the pizza cutter at step 130.

When the pizza cutter 10b is used having a second fixed blade 12b is used, the steps 110-114 and 124-128 of rotating the pizza cutter 90 degrees and making a second cut are not necessary. When the pizza cutter 10c having a second spring loaded blade 12c is used, the steps 110 and 124 of rotating the pizza cutter 90 degrees may include aligning the blade 12c with the prior cut.

While the invention herein disclosed has been described by means of specific embodiments and applications thereof, numerous modifications and variations could be made thereto by those skilled in the art without departing from the scope of the invention set forth in the claims.

We claim:
1. A method for cutting pizza, the method comprising:
placing a pizza in a pizza box;

positioning extenders at ends of a pizza blade, the extenders reaching a distance equal to a diagonal distance between opposite interior corners of the pizza box;
pushing the cutter down into the pizza with extenders reaching into the opposite interior corners of the pizza box;
making a first diagonal cut;
lifting the pizza cutter;
rotating the pizza cutter 90 degrees;
pushing the cutter down into the pizza with extenders reaching into second opposite interior corners of the pizza box;
making a second diagonal cut;
lifting the pizza cutter;
aligning the pizza cutter over the pizza and intersecting the first diagonal cut and the second diagonal cut for a first square cut;
pushing the cutter down into the pizza;
making the first square cut;
lifting the pizza cutter;
rotating the pizza cutter 90 degrees;
pushing the cutter down into the pizza;
making a second square cut; and
lifting the pizza cutter.

2. A pizza cutter comprising:
a handle;
at least one blade having a length $L1$ of 14⅛ inches, and a cutting edge on the bottom of the blade opposite to the handle and running the length of the blade;
extenders at opposite ends of the cutter, the blade centered between outside ends of the extenders;
the opposite outside ends of the extenders separated by a distance $L2$ of 20 inches, the extenders reaching down to between about ⅜ inches above the cutting edge of the blade and even with the cutting edge of the blade, the outside ends configured to cooperate with opposite inside corners of a pizza box to align the blade for a diagonal cut of the pizza in the pizza box, and to provide clearance for vertical sides of the pizza box for square cuts when the pizza cutter is rotated 45 degrees.

3. A pizza cutter comprising:
a handle;
at least one blade having a length $L1$ of approximately the diameter of a pizza, and a cutting edge on the bottom of the blade opposite to the handle and running the length of the blade;
extenders at opposite ends of the cutter, the blade centered between outside ends of the extenders;
the opposite outside ends of the extenders separated by a distance $L2$ of the square root of two times the length $L1$, the extenders reaching down to between about ⅜ inches above the cutting edge of the blade and even with the cutting edge of the blade, the outside ends configured to cooperate with opposite inside corners of a pizza box to align the blade for a diagonal cut of the pizza in the pizza box, and to provide clearance for vertical sides of the pizza box for square cuts when the pizza cutter is rotated 45 degrees.

4. The pizza cutter of claim 3, wherein the extenders include pivots connecting the extenders to the blade and are pivotable to provide clearance for the vertical sides of the pizza box for square cuts.

5. The pizza cutter of claim 3, wherein the extenders are removable from the blade to provide clearance for the vertical sides of the pizza box for square cuts.

6. The pizza cutter of claim 3, wherein gaps are provided between opposite ends of the blade the extenders include pivots connecting the extenders to the blade and are pivotable to provide clearance for the vertical sides of the pizza box for square cuts.

7. The pizza cutter of claim 3, wherein the at least one blade is only one blade.

8. The pizza cutter of claim 7, wherein the one blade is about fourteen inches long.

9. The pizza cutter of claim 8, wherein the extenders add about six inches to the overall length of the blade.

10. The pizza cutter of claim 3, wherein the at least one blade is two blades angularly spaced apart by 90 degrees and are attached at the centers of the blades.

11. The pizza cutter of claim 10, wherein the two blades are fourteen inches long.

12. The pizza cutter of claim 11, wherein the extenders are attached on opposite ends of one of the two blades.

13. The pizza cutter of claim 12, wherein the two blades are both fourteen inches long.

14. The pizza cutter of claim 13, wherein the extenders add about seven inches to the overall length of one of the blades.

15. The pizza cutter of claim 3, wherein the blade length $L1$ is between 13.5 and 14.125 inches.

16. The pizza cutter of claim 15, wherein the blade length $L1$ is about 14.125 inches.

17. The pizza cutter of claim 16, wherein an overall length of the cutter with extenders is between 19.5 and 20.5 inches.

18. The pizza cutter of claim 17, wherein an overall length of the cutter with extenders is about 20 inches.

19. The pizza cutter of claim 3, wherein the extenders has pointed ends configured to intersect inside corners of the pizza box.

* * * * *